Feb. 3, 1959     R. T. BURNETT     2,871,661
HYDRAULIC TORQUE CONVERTER
Original Filed Sept. 8, 1951     2 Sheets—Sheet 1

INVENTOR.
RICHARD T. BURNETT.
BY
William N. Antonis
ATTORNEY.

United States Patent Office 2,871,661
Patented Feb. 3, 1959

2,871,661

HYDRAULIC TORQUE CONVERTER

Richard T. Burnett, South Bend, Ind., assignor to Bendix Aviation Corporation, South Bend, Ind., a corporation of Delaware Original application September 8, 1951, Serial No. 246,250, now Patent No. 2,745,295, dated May 15, 1956. Divided and this application November 2, 1955, Serial No. 544,424

3 Claims. (Cl. 60—54)

This invention relates to transmissions embodying hydro-kinetic torque converters.

This application is a division of my copending application Serial No. 246,250, filed September 8, 1951, now Patent No. 2,745,295 issued May 15, 1956.

An object of this invention is to provide a fluid pump for a hydro-kinetic transmission which is driven by the impeller or turbine wheels, depending on the speed ratio therebetween.

Another object of this invention is to provide a fluid pump for a hydro-kinetic transmission, which pump may be connected either directly to the input shaft to be engine driven, or to the output through a planetary gear train when a vehicle in which the transmission is incorporated is being pushed or towed for starting.

The above and other objects and features of this invention will be apparent from the following description of the apparatus taken in connection with the accompanying drawings which form a part of this specification, and in which:

Figure 3 is an enlarged fragmentary section of the pump and associated drive means.

Figure 1:
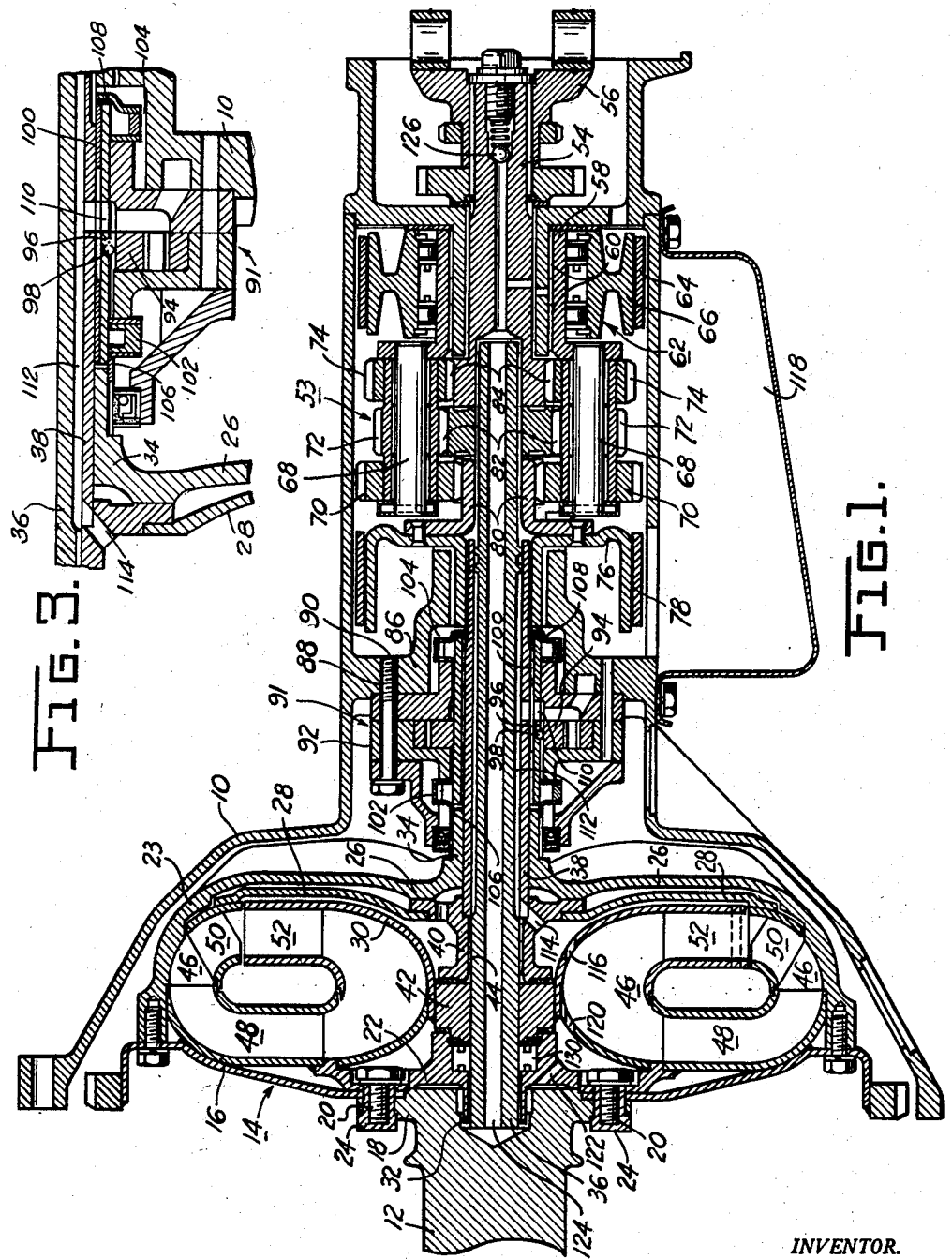
Figure 1 is a longitudinal sectional view of the transmission of the invention, with parts in elevation.

Referring now to Figure 1 for a detailed description of the transmission of my invention, the reference numeral 10 designates a housing which may be suitably secured to an automobile engine, not shown. Energy from the engine is transferred to an input shaft or crankshaft 12, which is drivably connected to a hydro-kinetic torque converter 14.

The torque converter comprises an impeller wheel 16 carried by a flange 18 integral with one end of the input shaft. Bolt studs 20 pass through a support 22 of the impeller wheel and threadedly engage bushings 24, peripherally spaced around the flange. The impeller wheel 16 is further equipped with a second support 26, axially spaced apart from said support 22 and together therewith provides an enclosure or shroud 23 for turbine wheel 28 and reaction wheel 30. The supports 22 and 26 have out-turned portions 32 and 34 respectively formed integral therewith to provide hollow stub shaft members. These hollow stub shaft members 32 and 34 rotatably support one end of concentric sleeves or shafts 36 and 38 respectively. The turbine and reaction wheels 28 and 30 are provided with hubs 40 and 42 respectively, which fit over said one end of sleeve 36. The hubs are carried on the sleeve 36 between the hollow stub shaft members 32 and 34. Hub 40, of the turbine wheel, is rotatably supported on a sleeve bearing 44, interposed between the hub and said sleeve 36. Hub 42, of the reaction wheel, is securely fixed to sleeve 36. The impeller, turbine, and reaction wheels are so shaped that together they provide a closed hydraulic circuit or toroidal channel 46, through which fluid is circulated by impeller blades or vanes 48 mounted in a circular row on the impeller wheel. This moving fluid, set in motion by the impeller blades, acts on blades or vanes 50 disposed in a circular row on the turbine wheel, to thereby impart rotation to the turbine wheel. The reaction wheel 30 is equipped with a circular row of blades or vanes 52, which are constituted to take reaction from the moving fluid as well as control the direction of flow of the fluid at the entrance of the impeller wheel, to thereby multiply torque into the turbine wheel. The construction and arrangement of the vanes are such as to produce an overdriving effect on the turbine wheel, as described in my application entitled "Torque Converter," Serial No. 701,595, filed October 5, 1946, now Patent No. 2,634,584. Although the torque converter of the instant application utilizes the same principles for obtaining overdrive as my previously mentioned filed application, the design and arrangement of the impeller and turbine vanes of the herein disclosed converter differ over the earlier filed application.

A torque multiplying planetary gear train 53 is interposed between the torque converter 14 and output shaft 54, to the outer end of which is splined a yoke 56. The gear train comprises a planet carrier 58, revolvably mounted on sleeve bearings 60. A free wheel device 62 is interposed between the planet carrier 58 and a brake band 64 to allow free rotation of said planet carrier in one direction beyond a one-to-one torque ratio of the transmission but to hold said planet carrier from rotation in the other direction during torque multiplication. This, of course, is based on the assumption that the brake band 64 which conditions the transmission for forward drive, is frictionally engaged with external wheel 66 of the free wheel device. With the brake band 64 out of contact with the wheel 66, the planet carrier is free to rotate in either direction. Any suitable means may be employed to operate the brake band 64, such, for example, as hydraulic actuation, not shown. Axially extending pins 68 are carried by the planet carrier 58, for rotatably supporting a cluster of planet pinions 70, 72, and 74. These pinions 70, 72, and 74 are integrally related. A drum 76 is splined to one end of the sleeve 38, to the other end of which is fixedly attached the turbine wheel 28. A brake band 78, which connects the transmission for reverse, is arranged for frictional engagement with the drum 76. Any suitable means may be employed for actuating the brake band 78, such, for example, as hydraulic actuation, not shown. Frictional engagement of drum 76 holds the turbine wheel stationary for a purpose to be hereinafter described. A sun gear 80 is carried on the drum 76 for meshing engagement with the pinions 70. The hollow sleeve 36, which carries the reaction wheel 30, is provided with a sun gear 82 arranged for driving engagement with the planet pinions 72. The inner end of driven shaft 54 is equipped with a sun gear 84 which engages the teeth of planet pinion 74.

In the planetary gearing arrangement of Figure 1, the gear ratios are such that with the planet carrier 58 held fixed to accomplish forward drive the torque transmitted to the output shaft 54 from the turbine shaft 38 is approximately 1.5 (one and a half) times the torque impressed on the turbine shaft 38 up to the clutch point of the transmission, at which time input torque equals output torque. During this same period prior to clutch point of the transmission, that is, prior to one-to-one torque ratio, the negative torque transmitted to the output shaft 54 from the guide shaft 36 is approximately only .7 (seven tenths) times the torque impressed on the shaft 36.

When in reverse drive the brake band 78 locks sun gear 80, which is integrally related to shaft 38, to the other end of which is fixed the turbine wheel 50. The reaction wheel, which is now free to rotate, is driven in a direction opposite to the impeller wheel to thereby drive sun gear 82 which meshes with the planet pinions 72. Since the planet carrier is now free to rotate, the planet pinions 72 rotate about pins 68 as a moving center, driving the output shaft 54, through gears 74 and 84, with the reaction being taken through gears 70 and 80 into the band 78. In the present illustration the gear ratio of the shaft 36 to the output shaft 54 is in the neighborhood of 1.7 to 1. This ratio obviously provides for a relatively high torque at the output shaft compared to the torque impressed on the shaft 36 at any instant of time. It is to be understood that wherever specific values are used herein it is for purpose of illustration only and the specification is, therefore, not to be limited thereby.

In order to pressurize the fluid for actuating the bands 64 and 78 and to put the fluid in the toroidal channel 46 under pressure a pump 91 is provided. The pump herein used to put the fluid under pressure is believed to embrace certain novel two-way driving features hereinafter described. The housing 10 is formed with an internal radially extending flange 86, drilled and threaded axially at 88 for the reception of screws 90, one only of which is shown. The screws pass through a pump housing 92 and threadedly engage the radial flange. A pump rotor 94 is mounted on a sleeve 96 to be driven thereby through a ball member 98. The sleeve 96 is concentrically positioned with respect to the sleeve 38 and rotates on sleeve bearings 100 interposed between the sleeve 38 and the sleeve 96. The latter sleeve is driven by two one-way clutches 102 and 104 but at different times, depending on which is rotating faster, the turbine or impeller wheel. The one-way clutch 102 is drivably interposed between the hollow stub shaft member 34 and the sleeve 96 so that when the speed ratio of turbine wheel to impeller wheel is less than one to one the pump rotor 94 will be revolved by the impeller to thereby pressurize the hydraulic circuit. Beyond a one to one speed ratio of turbine to impeller wheel the turbine wheel speed will be greater and hence drive the pump rotor. A collar member 106 connects the member 34 to the one-way clutch 102. When the speed ratio of turbine to impeller is less than one to one the one-way clutch 104, which is drivably interposed between the sleeve 96 and the sleeve 38, is overrunning. However, when the speed ratio of turbine to impeller is greater than one to one, as would be the case some time before the clutch point of the transmission was reached, as indicated by the intersection of the curves at O, the turbine wheel, which is integral with sleeve 38, drives the pump rotor 94. At this time, the one-way clutch 102 is overrunning. A collar member 108 drivably connects the sleeve 38 to the one-way clutch 104. Outlet 110 of the pump communicates with the toroidal channel 46 through passages 112, 114, and 116. The toroidal channel 46 communicates with reservoir 118 through passages 120, 122, 124, past valve 126 and thence back to the reservoir via a conduit, not shown. The inlet of the pump, not shown, communicates with the reservoir 118, through an internal passage, not shown. The pump per se forms no part of the present invention but, as aforementioned, the manner of driving the same from two sources is believed novel.

A one-way clutch 130 is interposed between the concentric shaft 36 and the input shaft 12 so that this shaft can be driven by the vehicle at times to thereby drive the engine, not shown, so as to produce a braking or decelerating action on said vehicle. This mechanism is claimed per se in my application Serial No. 5,546 filed January 31, 1948, now Patent No. 2,616,308.

Figure 2:
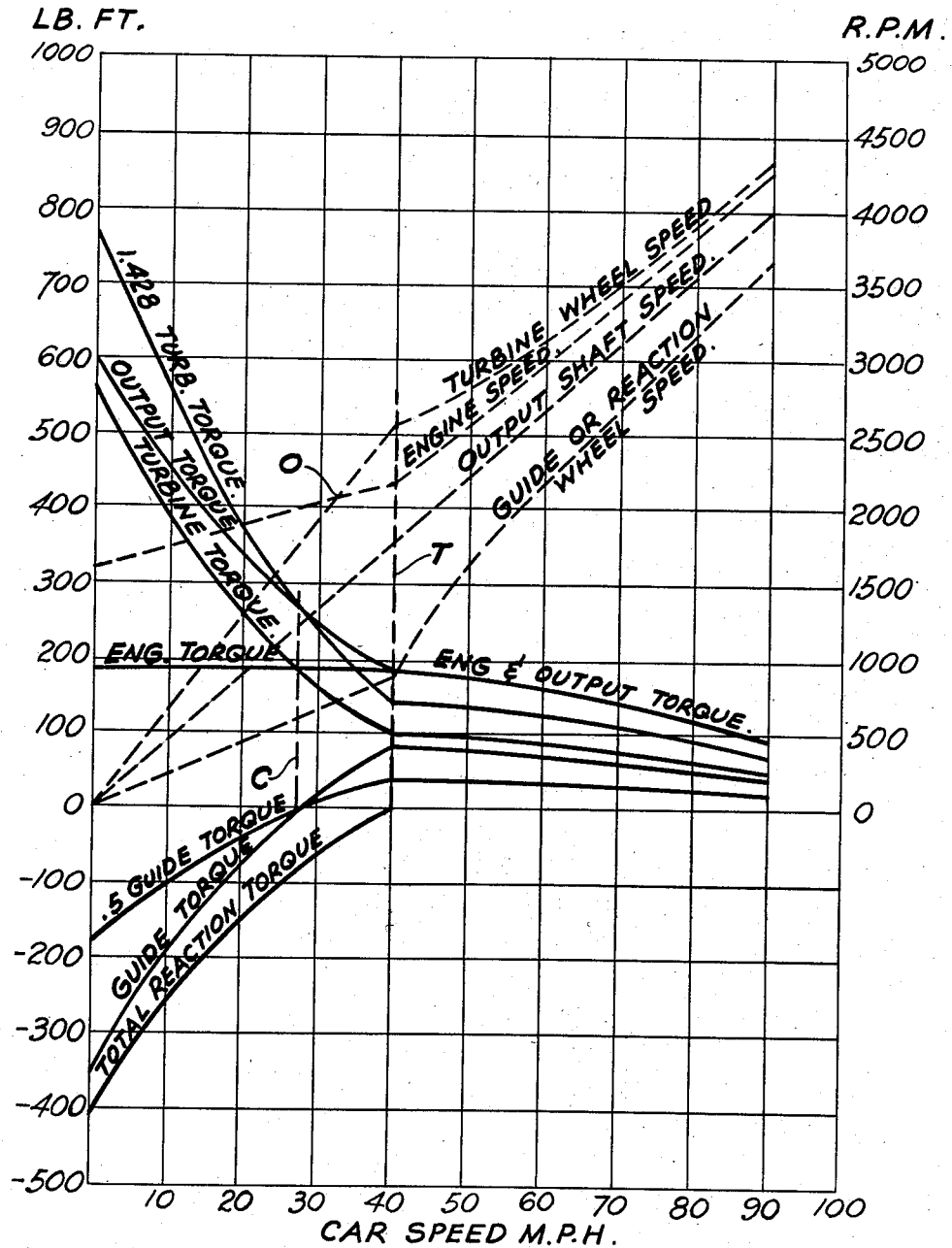
Figure 2 shows the performance curves of the transmission of Figure 1.

With reference to Figure 2 torque is represented by full line curves and R. P. M. by broken line curves. The reaction in the transmission is represented as a negative torque below the abscissa. The reaction on the guide or reaction wheel will be negative so long as the torque converter multiplies torque. As soon as torque multiplication in the converter has ceased, that is, torque input to the converter equals torque output of the converter, the reaction torque becomes zero as indicated by the intersection of the abscissa and the reaction torque curves. This is commonly termed the "clutch point" of the converter and is that point at which the fluid enters the guide or reaction wheel at such an angle that no change in angular momentum of the fluid takes place. A vertical line C has been drawn through this point for ready reference to the condition of the elements of the transmission. Although the reaction torque of the reaction wheel has become zero, as aforementioned, the total reaction torque of the transmission is still negative due to torque multiplication in the planetary gear train 52, as best shown in Figure 2 where the total reaction torque is below the abscissa. When torque multiplication of the transmission ceases, that is, input and output torque become equal, the total reaction torque becomes zero, as indicated by the intersection of the "total reaction torque" curve with the abscissa. This point of intersection of the "total reaction torque" curve with the abscissa is defined as the "clutch point" of the transmission and a vertical line T is drawn therethrough for ready reference to the condition of other elements of the transmission at this point.

With the output shaft speed curve as a reference it will be noted that the reaction wheel speed increases at a slower rate and the turbine wheel speed increases at a greater rate up to the clutch point of the transmission beyond which the curves representing the reaction and turbine wheel speeds converge on the curve representing the output shaft speed.

From a stall condition with the engine idling at about 1600 R. P. M. the engine speed curve rises to 2,150 R. P. M. at the clutch point T, of the transmission, during which time engine torque has remained substantially constant as shown by the engine torque curve. The output shaft and engine speed curves tend to converge at the clutch point. Beyond the clutch point T, that is, during the coupling range, engine speed continues to be greater than output shaft speed with a relatively small percentage of slip between them.

Between stall and the clutch point C of the converter the output torque at any instant is equal to the total turbine torque in the planetary gear train, which is represented by curve "1.428 turbine torque," minus .5 guide torque. Beyond the clutch point C of the converter the guide wheel torque becomes positive and is added to the turbine torque. At the clutch point T of the transmission engine torque equals output torque as shown by the intersection of the output and engine torque curves. This occurs at a vehicle speed of approximately 40 miles per hour.

Operation and function of the transmission:

Referring now to Figure 1, with the crankshaft 12 rotating and brake bands 64 and 78 released, there can be no torque reaction and consequently no torque multiplication. If the forward brake band 64 is now caused to frictionally engage the external wheel 66 a negative torque reaction is taken thereby through the planet carrier 58, thence through the free wheel device 62. Shortly after the brake band has locked the transmission into forward drive, torque will be impressed on the output shaft 54, which will begin to rotate when the torque reaches a value sufficient to overcome the load on the output shaft. The torque impressed on the input shaft is first multiplied in the torque converter, thence transmitted through the sleeve 38, to which sun gear 80 is drivably connected, and into the planetary gear train 53, where the torque is again multiplied before being transferred to the output shaft. During the period of torque multiplication in the transmission, that is, so long as torque output exceeds torque input, the reaction will be in a direction through said free wheel device 62 to lock the same against rotation. During this period the reaction wheel is driven forward in the same direction as the impeller and turbine wheels but at a rate less than turbine wheel speed. That is the reaction wheel is driven forward at a fixed ratio with respect to the turbine wheel. As hereinbefore explained this is accomplished by interposing the planetary gear train between the turbine and reaction wheels. Beyond a torque ratio of unity, that is, the clutch point of the transmission, at which time torque reaction in the transmission has ceased, the planet carrier 58 will be free to rotate in a direction opposite to that in which reaction was tending to rotate said planet carrier. At this time the torque converter is performing as a hydraulic coupling. As is obvious from an examination of the curves of Figure 2, beyond the "clutch point" of the transmission the turbine wheel speed rises at a slower rate, the engine speed rises at a greater rate, and the reaction wheel speed also rises at an increased rate. This trend will continue with the input shaft speed approaching the output shaft speed as the car speed is increased.

Assume a condition in the transmission wherein the forward brake band 64 is released and the reverse brake band 78 is caused to frictionally engage the drum 76, to thereby lock the sun gear 80 against rotation. With this arrangement the turbine wheel 50 is held against rotation, since it is carried by the sleeve 38 onto which the locked sun gear 80 is splined. The reaction wheel will be revolved in a direction opposite to the impeller wheel, under the influence of the circulating fluid to thereby drive the concentric shaft 36. The sun gear 82 is securely fixed to the other end of the shaft 36 for driving engagement with the planet pinion 72. This drives the output shaft in a reverse direction and at a reduced speed.

Although this invention has been described in connection with certain specific embodiments, the principles are susceptible of numerous other applications that will readily occur to persons skilled in the art.

Having thus described the various features of the invention, what I claim as new and desire to secure by Letters Patent is:

1. In a hydro-kinetic transmission having rotatable blade impeller and turbine wheels forming a closed hydraulic circuit, the combination of a pump having a rotor and input and output openings, a fluid source connected to said input opening, a fluid connection from the output opening to the closed hydraulic circuit, a first sleeve connected to said turbine wheel, a hollow stub shaft concentric with said first sleeve and connected to said impeller wheel, a second sleeve concentric with said first sleeve and adjacent said stub shaft, said pump rotor being mounted on said second sleeve for rotation therewith, bearing means interposed between said first and second sleeves for permitting relative rotation therebetween, a first one-way clutch concentric with said second sleeve and drivably connecting said second sleeve with said first sleeve, and a second one-way clutch concentric with said second sleeve and drivably connecting said second sleeve with said stub shaft.

2. In a hydro-kinetic transmission having rotatable bladed impeller and turbine wheels forming a closed hydraulic circuit, the combination of a pump having a rotor for delivery of fluid to the hydraulic circuit, a first sleeve connected to said turbine wheel, a hollow stub shaft concentric with said first sleeve and connected to said impeller wheel, a second sleeve concentric with said first sleeve and drivably connected to said pump rotor for rotating said rotor, bearing means interposed between said first and second sleeves for permitting relative rotation therebetween, a first one-way clutch drivably connecting said second sleeve with said first sleeve, and a second one-way clutch drivably connecting said second sleeve with said stub shaft.

3. In a hydro-kinetic transmission having rotatable bladed impeller and turbine wheels forming a closed hydraulic circuit, the combination of a pump having a rotor for delivery of fluid to the hydraulic circuit, an inlet and outlet in said pump, a fluid source connected to said inlet, a passage from the outlet to the closed hydraulic circuit, a first sleeve connected to said turbine wheel, a hollow stub shaft surrounding said first sleeve and connected to said impeller wheel, a second sleeve surrounding said first sleeve and adjacent said stub shaft, said pump rotor being mounted on said second sleeve for rotation therewith, a first one-way clutch drivably connecting said second sleeve with said first sleeve, and a second one-way clutch drivably connecting said second sleeve with said stub shaft.

References Cited in the file of this patent

UNITED STATES PATENTS

| | | |
|---|---|---|
| 1,998,922 | Chamberlain et al. | Apr. 23, 1935 |
| 2,013,126 | Bonn | Sept. 3, 1935 |
| 2,363,983 | Miller | Nov. 28, 1944 |
| 2,603,984 | Swift | July 22, 1952 |
| 2,629,265 | Dodge | Feb. 24, 1953 |
| 2,691,940 | McFarland | Oct. 19, 1954 |
| 2,736,412 | Livezey | Feb. 28, 1956 |